United States Patent [19]
Hostetler et al.

[11] Patent Number: 5,136,983
[45] Date of Patent: Aug. 11, 1992

[54] FLUSH APPARATUS FOR WATERING SYSTEMS

[75] Inventors: Eldon Hostetler, Middlebury; Keith Sheets, Nappanee, both of Ind.

[73] Assignee: Ziggity Systems, Inc., Middlebury, Ind.

[21] Appl. No.: 579,813

[22] Filed: Sep. 10, 1990

[51] Int. Cl.⁵ .............................................. A01K 7/00
[52] U.S. Cl. ........................................................ 119/72
[58] Field of Search ...................... 119/72, 72.5, 75, 78

[56] References Cited

U.S. PATENT DOCUMENTS

| | | |
|---|---|---|
| 2,619,115 | 11/1952 | Dondero et al. |
| 3,537,430 | 11/1970 | Peppler ............................ 119/72.5 |
| 4,640,304 | 2/1987 | Looney . |
| 4,669,422 | 6/1987 | Steudler, Jr. . |
| 4,757,784 | 7/1988 | Hammer ............................ 119/72 X |
| 4,794,881 | 1/1989 | Rader . |
| 5,025,754 | 6/1991 | Plyler . |

FOREIGN PATENT DOCUMENTS 1189406  11/1985  U.S.S.R. ................................. 119/72

Primary Examiner—Gene Mancene
Assistant Examiner—Thomas Price
Attorney, Agent, or Firm—Barnes & Thornburg

[57] ABSTRACT

A flushing system for poultry watering systems is provided which includes a by-pass of the upstream pressure regulator, self sealing caps for the stand pipes and an automatic flush valve at the end of the supply line. A shut-off valve in the by-pass is provided which is actuatable manually or automatically in response to a timer, environmental sensor or water condition sensor. The automatic flush valve opens a response to a predetermined pressure level and connects the supply line to a drain hose. The self sealing caps prevent leakage out of the standpipes and are especially formed to prevent blow outs of the seal. Where multiple pressure regulators are used in the supply line, additional automatic flush valves can be positioned in a by-pass line around those regulators.

9 Claims, 3 Drawing Sheets

FLUSH APPARATUS FOR WATERING SYSTEMS

BACKGROUND AND SUMMARY OF THE INVENTION

The present invention relates generally to watering systems for poultry and small animals and, more particularly, to nipple drinker-type watering systems.

Over the years numerous nipple drinker watering systems have been attempted. Some of the most widely used nipple drinker watering systems are currently manufactured by Ziggity Systems, Inc. of Middlebury, Ind. These watering systems involve the use of several branching water supply lines extending the length of a poultry house interior. Numerous nipple drinkers are attached to the water supply lines so that the poultry may obtain water by pecking at the nipples. Water pressure regulators are spaced as needed along the water supply lines so as to keep water pressure to the nipple drinkers within acceptable levels. Typically, one such pressure regulator will be needed at the head of each water supply line to reduce pressure coming in from the pump. Often, however, if the watering system is used in a floor raising system, such as for broiler poultry, the poultry house will have a sloped floor. Since the water supply line typically has a corresponding slope, additional pressure regulators are used at spaced locations along the supply line to keep water pressure within acceptable levels. With the Ziggity watering systems it has been found advantageous to start poultry out at approximately three inches of water pressure and end growing at less than twelve inches of water pressure. The pressure regulators are typically provided with clear plastic standpipes to visually demonstrate the water pressure level to the grower. An end-line standpipe is also used to demonstrate pressure levels at the end of the supply line.

It has been found to be advantageous to periodically flush nipple drinker watering systems both between flocks and sometimes during flock growth. Such flushing is done to clean out the watering system and to increase water consumption by the poultry. Nipple drinker watering systems, as well as other closed water supply systems for poultry, occasionally need cleaning to remove any sediment which has accumulated in the water supply lines. There are many possible sources for this sediment. Some water supply filters do not effectively remove sediment from well water, occasionally such filters are not cleaned or replaced as frequently as needed, and in some instances it has been found that growers supply water additives which cause sediment build-up. It is common to introduce chlorine into water supplies to cut down on bacteria growth. It is also common to add various types of medication to water supplies to increase the health of poultry against certain diseases. However, certain forms of medication are believed to react with chlorine, especially if excessive amounts of chlorine are added to the water supply, when both additives are used at the same time. This reaction appears to result in the accumulation of sediment in the water supply lines. This sediment does not usually pass through the nipple drinker immediately in Ziggity watering systems because of a raised tube within the water supply line for connecting water flow to the nipple drinker. Sediment accumulation can, however, interfere with proper water flow along the water supply line and eventually contribute to malfunction of the nipple drinkers.

Nipple drinkers watering systems can also benefit from periodic flushing when excessive amounts of water additives are present in the water, particularly chlorine. Some growers who are not totally familiar with closed water supply systems for feeding poultry continue the same additive practices they used with open supply watering systems. For example, because closed water supply systems, such as nipple drinker watering systems, limit the ability of chlorine to evaporate from the water, far less chlorine is needed to achieve protection against bacteria than with open water supply systems, such as trough drinkers. However, growers who have recently switched over to a nipple drinker watering systems may still, due to inexperience with the new systems, use the same amount of chlorine as with the prior systems. This excess chlorine can, over a period of time, adversely affect important components of the nipple drinker watering systems and has been found to adversely affect the health of the poultry.

Flushing of poultry watering systems can increase water consumption by the poultry especially in hot weather. With the increased cost of energy consumption it is more difficult and/or expensive to maintain comfortable, stable temperatures in poultry houses during hot weather. As temperatures are allowed to increase, poultry need to consume more water to maintain proper health and growth rates. Water in supply lines has been found to increase in temperature down the supply line, especially in hot weather and where that supply line is several hundred feet long within the poultry house. It has been found that warmer water is less attractive to poultry than cooler water. Thus, at the same time poultry have a greater need of water, they are less inclined to obtain it. Flushing out the warmer water in the supply has been found to reduce the water temperature by 10°-15° F. and to increase poultry consumption of the water.

Previous methods and apparatus of flushing out nipple drinker watering systems have been more expensive, time consuming and labor intensive than is desireable. Manually operated valves have generally been provided to isolate each and every pressure regulator from the water supply lines, along with regulator bypass lines (also manually valved) and a manually operated flush valve at the end of the lines. It has often been necessary to isolate the pressure regulators in order to achieve a high pressure flush. For example, many commercially available pressure regulators employ a standpipe of less than 24 inches in height. Applying high pressures (of 2 pounds, for example) could force water up and out of the standpipe, even past the float ball often used. Similarly, it has been necessary to isolate or specially seal the end-line standpipe. Also, the manually operated valves have often been deliberately stiff or included safety latches or similar means to avoid inadvertent actuation by the poultry. Thus, manual operation of these valves to flush the watering system has not been a trivial task. Further, during the time it takes to flush the watering system the poultry are denied access to water.

Accordingly, it is an object of this invention to provide an improved method and arrangement of flushing poultry watering systems.

Another object is the provision of a flushing apparatus for nipple drinker watering systems which is actuatable manually or automatically and available at decreased expense.

A further object is to provide a means of flushing poultry watering systems automatically in response to environmental changes or changes in the state of the water supply.

These and other objects of the present invention are achieved by the provision of a flushing system which includes a bypass of the upstream pressure regulator, self sealing caps for the standpipes, and an automatic flush valve at the end of the supply line. A shutoff valve in the bypass is provided which is actuatable manually or automatically in response to a timer, environmental sensor or a water condition sensor. The automatic flush valve opens in response to a predetermined pressure level and connects the supply line to a drain hose. The self sealing caps prevent leakage out of the standpipes and are specially formed to prevent blow outs of the seal. Isolating valves for each pressure regulator are not necessary. Where multiple pressure regulators are used in the supply line, additional automatic flush valves can be used in the existing bypass lines of those regulators instead of manual valves.

Other objects, advantages and novel features of the present invention will become apparent from the following detailed description of the invention when considered in conjunction with the accompanying drawings.

DESCRIPTION OF PREFERRED EMBODIMENTS

Figure 1:
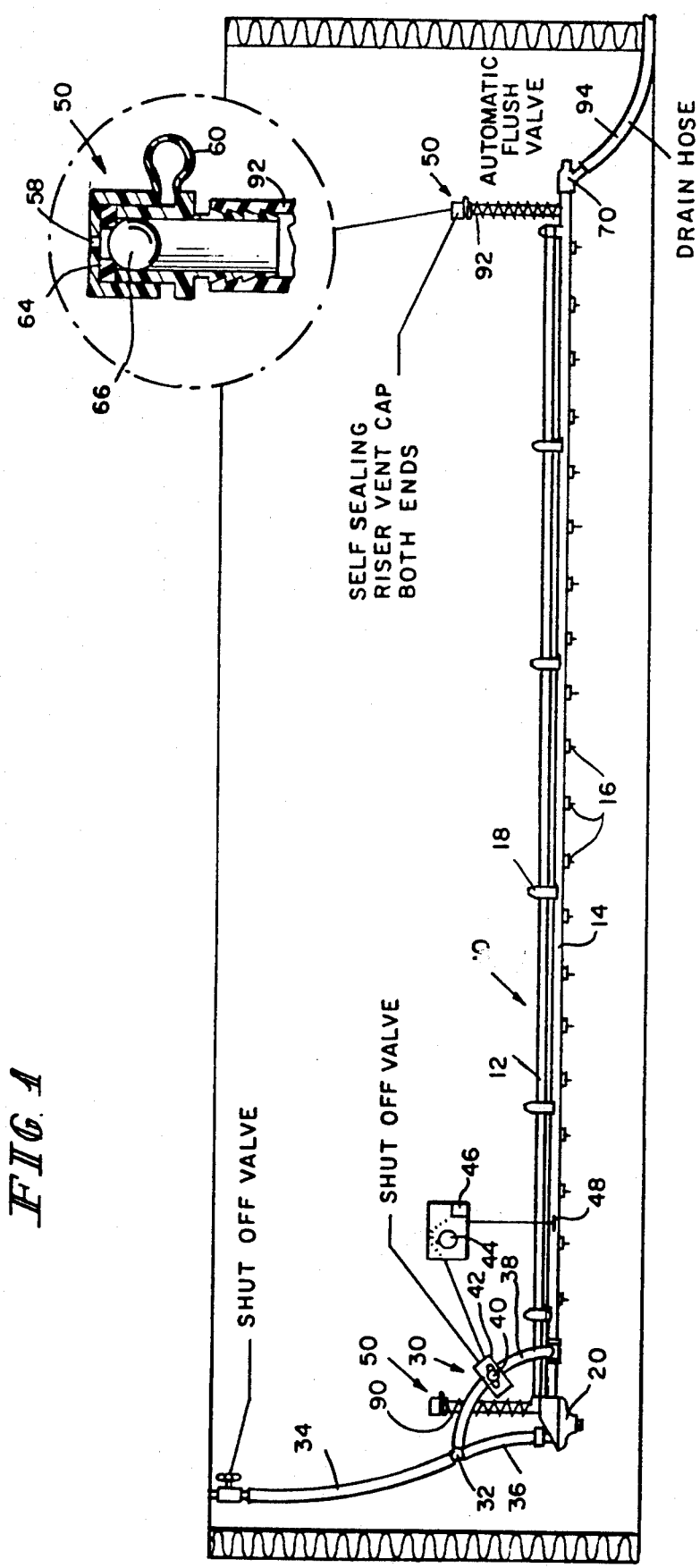
FIG. 1 shows a side plan view of a nipple drinker watering system employing the present invention.

FIG. 1, which illustrates a preferred embodiment of the present invention, shows a conventional nipple drinker watering system 10, including support pipe 12, water supply line 14, nipple drinkers 16, connecting brackets 18, and pressure regulator 20. Each of these elements is commercially available from Ziggity Systems, Inc. Similar elements have been described in previous patents, notably U.S. Pat. No. 4,491,088. Nipple drinker watering systems are used in floor or cage poultry raising systems. In a floor system support pipe 12 is often adjustably suspended from the ceiling; in a cage system support pipe 12 and brackets 18 are not needed since supply line 14 can be supported by resting on the top of the poultry cages. For purposes of illustration the present invention is shown with a floor system, although it must be understood the present invention is equally applicable to cage systems.

This invention includes a pressure regulator by-pass arrangement 30, self sealing caps 50 for the water pressure standpipes, and an automatic flush valve 70 for the end of the water supply line. Pressure regulator by-pass arrangement 30 includes Y shaped hose 32 connected at its base to main water supply hose 34. One arm 36 of hose 32 is connected to the inlet of pressure regulator 20. The other arm 38 of hose 32 is connected to supply line 14 downstream from the outlet of pressure regulator 20. Arm 38 includes a shut off valve 40 which is closed to prevent water flow from hose 32 to supply line 14 except during flushing. During normal use of watering system 10 pressure regulator 20 reduces water pressure from hose 32 to only a few inches of pressure, depending upon the age of the poultry. During flushing valve 40 is opened and arm 38 permits the full pressure of water from hose 32, usually several pounds of pressure, to be applied directly to supply line 14. This increased water pressure quickly flushes out existing water and any sediment in supply line 14.

Valve 40 can be opened manually or automatically. Automatic actuation of valve 40 can, for example, be accomplished by a solenoid 42 which is triggered by a timer 44. Alternatively or in addition, solenoid 42 can be made to trigger in response to a sensor 46 of external conditions and/or a sensor 48 of internal conditions. Sensor 46 can, for example, be a thermostat indicating temperature in the poultry house. Sensor 48 can, for example, be a thermostat indicating water temperature, sediment level, or chlorine level in supply line 14. Determining the number of triggering conditions can be left to the discretion of the poultry grower as numerous electronic and mechanical logic circuits are commercially available to satisfy virtually any level of automation desired.

Figure 2:
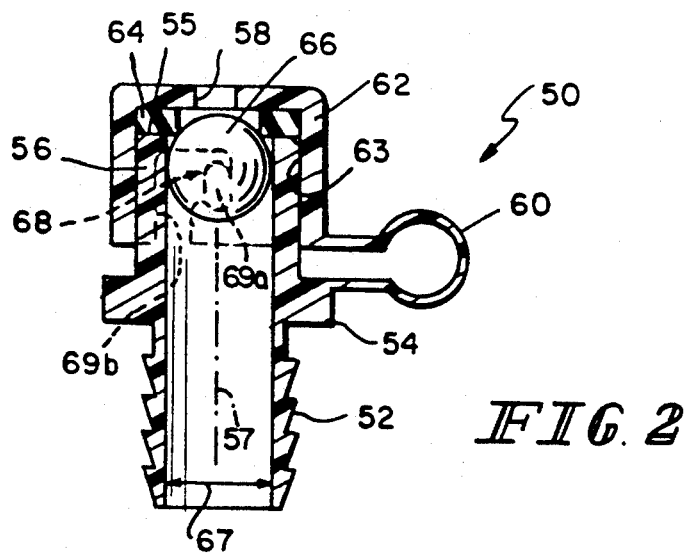
FIG. 2 shows a cross-sectional view of the self sealing cap employed in the present invention.

Self sealing caps 50 are preferably applied to every standpipe in watering system 10. Usually such standpipes (also called "riser tubes") are found at every pressure regulator and at the end of the supply lines. For purposes of illustration, pressure regulator standpipe 90 and end-line standpipe 92 are illustrated in FIG. 1. As shown in FIG. 2, caps 50 include lower attachment portion 52, stop 54, float retaining portion 56, air vent 58, connecting bright 60, retainer 62, seal 64, float 66 and latch means 68.

Attachment portion 52 secures cap 50 to each standpipe. The specific means of attachment can vary depending upon the composition and structure of the standpipe as long as the attachment means retains cap 50 to the standpipe against the water pressure of hose 32 plus the additional pressure caused by any slope of supply line 14. When using the current standpipes of Ziggity Systems, Inc. the preferred embodiments of the present invention employ polypropylene material (such as 8410 ZR) to form cap 50 and a close fitting ferrule formation as attachment portion 52 to fit inside the upper opening of the standpipes. Stop 54 serves to limit the insertion of portion 52 into the standpipe and, by visual inspection, to indicate the extent of such insertion.

Float retaining portion 56 forms the upper limit chamber for movement of float 66 (preferably a hollow plastic ball). In prior watering systems each standpipe is usually provided with a float to indicate visually the level of water pressure at that point in the supply line. Prior standpipes were also vented at the upper portion to allow the float to move freely and for any air trapped in the supply line to easily escape. In the present invention these same features are employed with float 66 being dimensioned with respect to interior diameter 67 of cap 50 to also move freely into and out of portion 56 along axis 57 and to permit air to escape through vent 58. The present invention does not, however, permit water to escape from the vents in the standpipes in response to water pressures used for flushing supply line 14.

Retainer 62 is connected to stop 54 by connecting bight 60. Bight 60 is dimensioned and formed so as to be flexible and able to be folded back upon itself such that retainer 62 can be fit over portion 56. Seal 64, preferably a rubber washer, is disposed between top surface 55 of portion 56 and interior surface 63 of retainer 62. The inside diameter of seal 64 is less than and dimensioned with respect to the diameter of float 66 such that when float 66 is forced upward against seal 64 by the water pressure used for flushing, float 66 rests against seal 64 to prevent water leakage past seal 64. Retainer 62 prevents seal 64 from being lifted out of place or otherwise moved by float 66 and/or the water pressure in a manner which would permit water leakage past or around seal 64. Retainer 62 preferably compresses seal 64 between surfaces 55 and 63.

Figure 3:
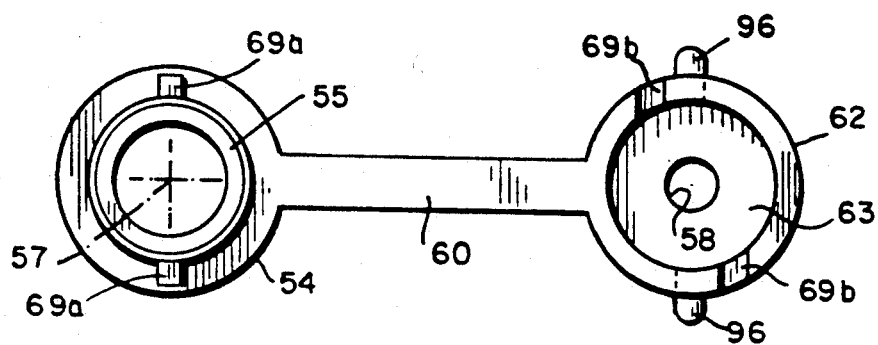
FIG. 3 shows a top plan view of the disassembled self sealing cap of the present invention without the presence of a float ball.
Figure 4:
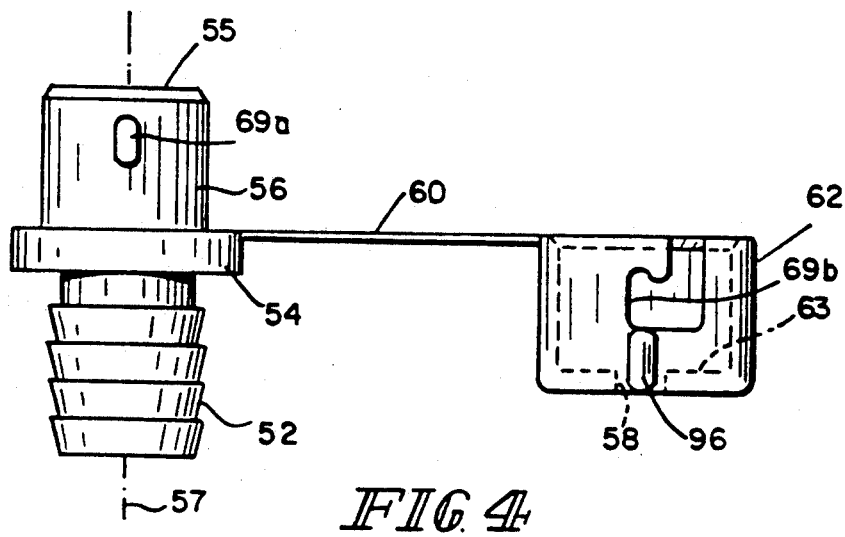
FIG. 4 shows a side plan view of the self sealing cap of the present invention corresponding with FIG. 3.

Retainer 62 is held in place over portion 56 during flushing by latch means 68. As shown in FIGS. 2 through 4, latch means 68 is preferably a bayonet-type connection wherein two projections 69a on opposite sides of the exterior surface of portion 56 are matingly received in two J-shaped slots 69b of retainer 62. Nubs 96 are preferably employed on retainer 62 to facilitate the slight locking rotation necessary to secure projection 69a within slots 69b.

When valve 40 is opened water pressure in supply line 14 will rise in response to the increased pressure from hose 34 and float 66 will rise to engagement with seal 64. However, once the water pressure in supply line 14 reaches a predetermined level, preferably 2 pounds of pressure, flush valve 70 will automatically open and permit drainage through drain hose 94. Water and any sediment from supply line 14 passes through hose 94 to a reservoir or other container outside of the poultry house. After sufficient flushing has occurred (typically 3-5 minutes at 2 pounds of water pressure in a 250 foot long supply line), valve 40 is closed, water pressure in supply line 14 drops back to normal level and flush valve 70 automatically closes.

Figure 5:
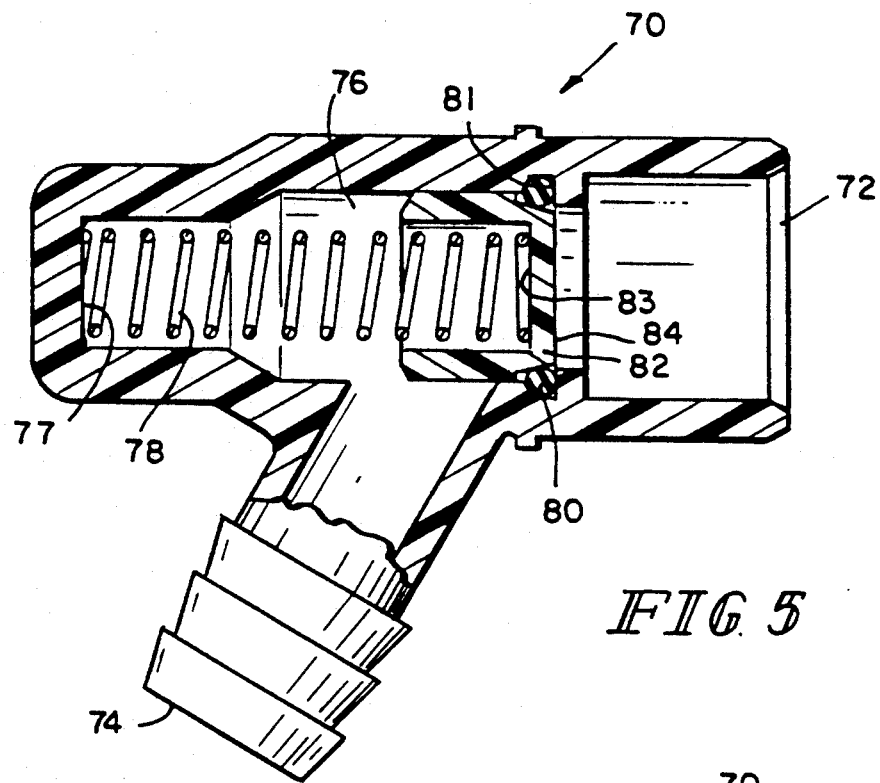
FIG. 5 shows a partial cross-sectional view of the automatic flush valve according to the present invention with the valve element therein also in cross section.
Figure 6:
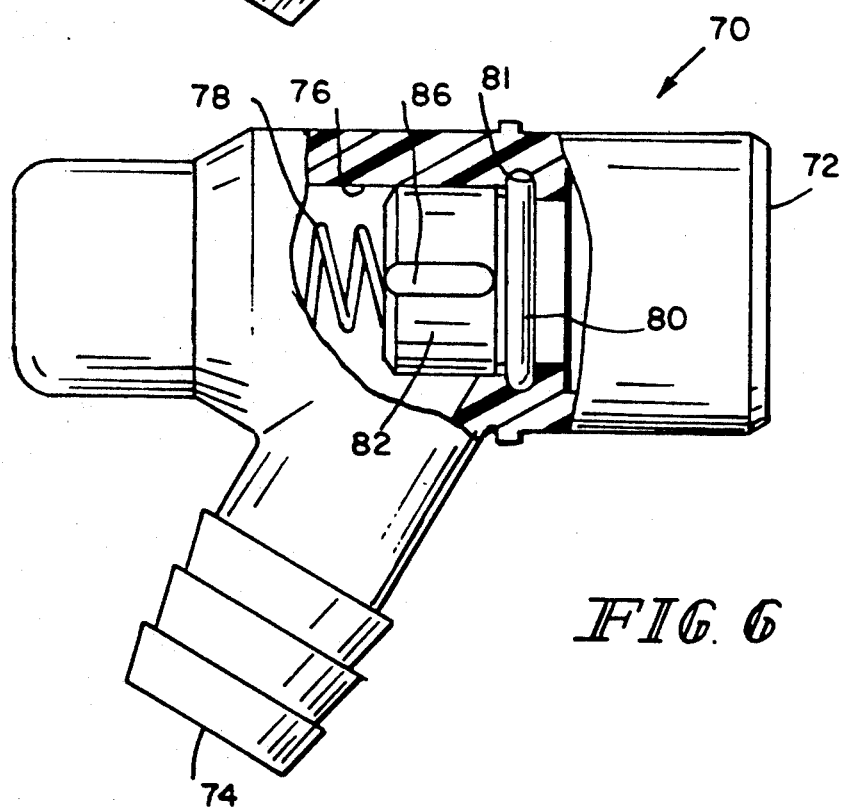
FIG. 6 shows a side plan view of the automatic flush valve with a portion thereof broken away to illustrate a side plan view of the valve element therein.

As shown in FIGS. 5 and 6, flush valve 70 includes an inlet 72 connected to supply line 14, an outlet 74 connected to drain hose 94 and a valve chamber 76 therebetween for receiving biasing spring 78, seal 80 and valve element 82. Biasing spring 78 is mounted between rear wall 77 of valve chamber 76 and rear wall 83 of the valve element 82. Seal 80, preferably a rubber O-ring, is mounted in recess 81 within valve chamber 76. Biasing spring 78 urges valve element 82 into contact with seal 80 to shut off flow of water between inlet 72 and outlet 74 through valve chamber 76 until the force of the water pressure in supply line 14 which is extended against front wall 84 of the valve element 82 exceeds the force of biasing spring 78 against rear wall 83. Spring 78 may, thus, be selected to establish the desired flushing water pressure in a particular system. Projections 86 are provided on the exterior surface of valve element 82, and mating slots of longer dimension (not illustrated explicitly in the drawings) are provided on the interior surface of valve chamber 76 to assist in smooth alignment and movement of valve element 82. Flush valve 70 can be connected to supply line 14 by any conventional means, including ultrasonic welding or plastic cement, and is preferably formed from ABS material. Flush valve 70 can similarly be connected to drain hose 94 by any conventional means, including a close fitting ferrule as shown.

With the present invention it is not necessary to include isolating valves for the pressure regulators along supply line 14. Thus, considerable cost savings are available in new installations. When retrofitting the present invention to existing systems, such isolating valves can merely be left open. When multiple pressure regulators are used on supply line 14, those regulators downstream from the initial regulator, regulator 20, have typically been provided with manually valved bypass lines for flushing. To apply the present invention in those systems the manual valve in the bypass lines of the additional regulators can be replaced by a flush valve 70 in each such bypass line. At the same time, the isolating valves for those additional regulators can be omitted or left open.

Although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. An arrangement for flushing fluid through a poultry watering system, comprising:
    means connected to said watering system for applying fluid to said watering system at fluid pressures greater than those normally experienced during poultry watering,
    means connected to said watering system for preventing water from escaping from any air vents normally open during poultry watering, and
    means connected to said watering system for automatically connecting said watering system to a drain means for receiving the contents of said watering system during flushing.

2. An arrangement for automatically flushing water through a poultry watering system in response to predetermined conditions, wherein said watering system includes at least a supply line, a pressure regulator and a water pressure standpipe with an air vent therein, comprising:
    a hose means connected to said supply line, for providing greater water pressure to said supply line than is provided from said pressure regulator during normal poultry watering,
    first valve means, connected to said hose means, for controlling the flow of water through said hose means,
    second valve means connected to said standpipe for preventing water leakage through said air vent, and
    third valve means connected to said supply line for automatically discharging the contents of said supply line in response to said greater water pressure.

3. A poultry watering system having a fluid supply source, pressure regulation means connected to said fluid supply source, at least one fluid supply line connected to said pressure regulation means, at least one air venting means connected to said fluid supply line, and means for automatically flushing fluid through said fluid supply line to a fluid drain, said means for automatically flushing fluid comprising:
    fluid bypass means connecting said fluid supply source and said fluid supply line so as to permit fluid to pass from said fluid supply source to said fluid supply line without passing through said pressure regulation means and when so doing increasing the fluid pressure in said fluid supply line;

sealing means connected to said venting means for automatically responding to said increased fluid pressure in said fluid supply line to close said air venting means to contain fluid within said poultry watering system, and valve means connected to said fluid supply line for automatically responding to said increased fluid pressure in said fluid supply line to discharge the fluid in said fluid supply line into said fluid drain.

4. The poultry watering system according to claim 3 wherein said fluid bypass means includes a fluid line having a check valve therein which is normally closed during poultry watering and is automatically opened in response to predetermined conditions.

5. The poultry watering system according to claim 3 wherein said sealing means includes an end cap means connected to said air venting means by an attachment mechanism that requires greater force to be asserted on said end cap means to remove it than to install it, said end cap means including a float ball and a fluid sealing ball seat against which said float ball is urged by said increased fluid pressure and said end cap means including a removable retainer portion which permits access to said float ball.

6. The poultry watering system according to claim 3 wherein said fluid supply line has a first and second end, said first end being connected to said pressure regulation means and said second end being connected to said valve means, and wherein said valve means includes a spring biased valve element which seals off said second end during poultry watering and opens during said increased fluid pressure.

7. A poultry watering system, comprising:
a fluid supply source,
a pressure regulator connected to said fluid supply source,
a fluid supply line connected at one end thereof to said pressure regulator and having a plurality of poultry watering devices attached thereto,
at least one air vent connected to said fluid supply line,
said pressure regulator including means to provide fluid from said fluid supply source to said fluid supply line at a first fluid pressure level which is suitable for normal watering of poultry,
said air vent including means for indicating when fluid within said fluid supply line is at said first fluid pressure level,
first means connected to said fluid supply line for providing fluid to said fluid supply line at a second fluid pressure level which is different from said first fluid pressure level,
second means connected to said air vent for resisting fluid escape from said poultry watering system in response to the presence of fluid at said second fluid pressure level,
third means connected at another end of said fluid supply line for automatically controlling the drainage of fluid out of said fluid supply line,
a fluid drain line connected to said third means, and
said third means being responsive to fluid pressure within said fluid supply line such that said third means prevents fluid to flow therethrough from said fluid supply line to said fluid drain line when said fluid is at said first fluid pressure level but permits said flow therethrough when said fluid is at said second fluid pressure level.

8. A watering system for use with poultry, comprising:
a fluid supply source,
a fluid supply line having means for dispensing fluid to said poultry,
a means connected to said fluid supply source and said fluid supply line for controlling the pressure of fluid in said fluid supply line, and
drainage means connected to said fluid supply line for automatically permitting fluid to flow therethrough out of said fluid supply line and away from said poultry in response to a predetermined level of fluid pressure in said fluid supply line.

9. A poultry water system, comprising:
a fluid supply source,
a fluid supply line having means for dispensing fluid to poultry,
a first means connected to said fluid supply source and said fluid supply line for controlling the pressure of fluid in said fluid supply line,
at least one air vent connected to said fluid supply line, and
a second means connected to said air vent for preventing fluid to pass through said air vent in response to a predetermined level of fluid pressure in said fluid supply line,
said second means including a removable closure member, a fluid sealing means retained by said closure member, and means for restraining removal of said second means from said air vent.

* * * * *

UNITED STATES PATENT AND TRADEMARK OFFICE
CERTIFICATE OF CORRECTION

PATENT NO. : 5,136,983
DATED : August 11, 1992
INVENTOR(S) : Eldon Hostetler, Keith Sheets It is certified that error appears in the above-identified patent and that said Letters Patent is hereby corrected as shown below:

In the Claims, claim 3, at column 7, line 4, please insert -- air -- after the word "said".

In the Claims, claim 9, at column 8, line 36, please delete "water" and insert -- watering --.

Signed and Sealed this

Twenty-fourth Day of August, 1993

Attest:

BRUCE LEHMAN

Attesting Officer    Commissioner of Patents and Trademarks